(12) United States Patent
Ishio et al.

(10) Patent No.: US 8,076,423 B2
(45) Date of Patent: Dec. 13, 2011

(54) POLYPHENYLENE SULFIDE RESIN COMPOSITION

(75) Inventors: Atsushi Ishio, Aichi (JP); Kei Saitoh, Aichi (JP); Sadayuki Kobayashi, Aichi (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 12/542,942

(22) Filed: Aug. 18, 2009

(65) Prior Publication Data

US 2009/0306309 A1 Dec. 10, 2009

Related U.S. Application Data

(62) Division of application No. 11/662,907, filed as application No. PCT/JP2005/012641 on Jul. 8, 2005, now abandoned.

(30) Foreign Application Priority Data

Sep. 17, 2004 (JP) ................................ 2004-271757
Feb. 9, 2005 (JP) ................................ 2005-032852

(51) Int. Cl.
C08G 69/46 (2006.01)
C08L 83/16 (2006.01)
(52) U.S. Cl. .................. 525/420; 525/431; 525/537
(58) Field of Classification Search .................. 524/186, 524/196; 525/114, 535
See application file for complete search history.

(56) References Cited

U.S. PATENT DOCUMENTS

| | | | | |
|---|---|---|---|---|
| 4,528,346 A * | 7/1985 | Sugie et al. | ............... | 525/523 |
| 4,652,138 A * | 3/1987 | Inoue et al. | ............... | 366/89 |
| 4,772,664 A | 9/1988 | Ueda et al. | | |
| 5,387,652 A * | 2/1995 | Kawaki et al. | ............... | 525/419 |
| 5,759,732 A * | 6/1998 | Nakamura et al. | ......... | 430/108.1 |
| 5,786,422 A * | 7/1998 | Mizutani et al. | ............... | 525/64 |
| 5,859,176 A | 1/1999 | Nakahashi et al. | | |
| 6,241,375 B1 * | 6/2001 | Wang | ............... | 366/82 |
| 6,545,075 B2 | 4/2003 | Nishihata et al. | | |
| 6,713,545 B2 * | 3/2004 | Petiniot et al. | ............... | 524/224 |
| 6,890,091 B2 * | 5/2005 | Murakami et al. | ............... | 366/77 |
| 6,900,272 B2 | 5/2005 | Matsuoka et al. | | |
| 7,018,574 B2 * | 3/2006 | Koyama | ............... | 264/102 |
| 7,098,273 B2 * | 8/2006 | Yamada et al. | ............... | 525/420 |
| 7,115,312 B2 | 10/2006 | Matsuoka et al. | | |
| 2002/0107335 A1 | 8/2002 | Nishihata et al. | | |
| 2003/0113562 A1 * | 6/2003 | Bartsch et al. | ............... | 428/480 |

FOREIGN PATENT DOCUMENTS

| | | |
|---|---|---|
| JP | 59-155462 A | 9/1987 |
| JP | 63-189458 A | 8/1988 |
| JP | 3-056561 A | 3/1991 |
| JP | 3-081367 A | 4/1991 |
| JP | 3-231969 A | 10/1991 |
| JP | 5-051532 A | 3/1993 |
| JP | 10-120902 A | 5/1998 |
| JP | 11-293109 A | 10/1999 |
| JP | 2001-302918 A | 10/2001 |
| JP | 2003-113307 A | 4/2003 |
| JP | 2003-261687 A | 9/2003 |
| JP | 2004-059757 A | 2/2004 |

OTHER PUBLICATIONS

Original document and Machine Translation of JP 2003-113307 A Kobayashi et al.*
Utracki, L.A. Polymer Blends Handbook, vols. 1-2.. Springer-Verlag. Chapter 10.4.2.1 Processing Parameters: Screw and Barrel p. 691. Online version available at: http://knovel.com/web/portal/browse/display?_EXT_KNOVEL_DISPLAY_bookid=1117&VerticalID=0.*

* cited by examiner

*Primary Examiner* — Randy Gulakowski
*Assistant Examiner* — Mike M Dollinger
(74) *Attorney, Agent, or Firm* — DLA Piper LLP (US)

(57) ABSTRACT

A process for producing a polyphenylene sulfide resin composition includes melt-kneading about 99 to about 60 wt % of a polyphenylene sulfide resin (a) and about 1 to about 40 wt % of a polyamide resin (b), and about 0.1 to 10 parts by weight of a compatibilizing agent (c) per 100 parts by weight in total of the polyphenylene sulfide resin (a) and the polyamide resin (b), using a double screw extruder with two or more kneading portions at a temperature of the range from a melting peak temperature of the polyphenylene sulfide resin+10° C. to a melting peak temperature of the polyphenylene sulfide resin+70° C., wherein the polyamide resin (b) is excluded nylon 46 and has a relative viscosity of 1.5 or more measuring in concentrated sulfuric acid at a concentration of 1% and at 25° C., wherein the compatibilizing agent (c) is a compound having one or more types of groups selected from epoxy groups, amino group and isocyanate group, and wherein the resin composition has a morphology that the polyphenylene sulfide resin (a) in the resin composition forms a sea phase while the polyamide resin (b) in the resin composition forms an island phase, and the number average dispersed particle size of the polyamide resin (b) is kept at less than about 500 nm after the resin composition is melted and allowed to reside at 300° C. for 30 minutes.

4 Claims, No Drawings

POLYPHENYLENE SULFIDE RESIN COMPOSITION

RELATED APPLICATION

This is a divisional of U.S. Ser. No. 11/662,907, filed Mar. 15, 2007, which is a §371 of International Application No. PCT/JP2005/012641, with an international filing date of Jul. 8, 2005 (WO 2006/030577 A1, published Mar. 23, 2006), which is based on Japanese Patent Application Nos. 2004-271757, filed Sep. 17, 2004, and 2005-032852, filed Feb. 9, 2005.

TECHNICAL FIELD

The technology herein relates to a polyphenylene sulfide resin composition very excellent in toughness.

BACKGROUND

Polyphenylene sulfide (hereinafter abbreviated as PPS) resins have suitable properties as engineering plastics such as excellent heat resistance, barrier properties, chemicals resistance, electric insulation and wet heat resistance, and are mainly injection-molded or extrusion-molded for use as various electric/electronic parts, mechanical parts, automobile parts, etc.

However, since PPS resins are low in toughness compared with other engineering plastics such as nylons and PBT, they are limited in application and are strongly desired to be enhanced in toughness.

As methods for enhancing the toughness of a PPS resin, methods of mixing a high toughness material such as a polyamide resin with a PPS resin have been examined. For example, a method of mixing a polyamide and an organic silane compound with a PPS resin, a method of mixing a polyamide and an epoxy group-containing copolymer with a PPS resin, etc. are disclosed. However, the toughness levels achieved by these methods were not satisfactory. Further, many compositions obtained by mixing a polyamide with PPS are known. For example, disclosed are a composition with polyamide 11 or 12 with an average particle size of 1 μm or less dispersed in PPS, a composition comprising PPS, polyamide and epoxy resin, a composition comprising PPS and copolyamide, etc. However, dispersing a polyamide into PPS as ultrafine particles of less than 500 nm is not described at all. It would therefore be advantageous to obtain a polyphenylene sulfide resin composition very excellent in toughness.

SUMMARY

We found in our studies that, if a polyamide resin is dispersed into a PPS resin as ultrafine particles with a number average dispersed particle size of less than 500 nm, a PPS composition excellent in toughness can be achieved.

We therefore provide:

1. A polyphenylene sulfide resin composition comprising 99 to 60 wt % of a polyphenylene sulfide resin (a) and 1 to 40 wt % of a polyamide resin (b), wherein the polyphenylene sulfide resin (a) forms a sea phase while the polyamide resin (b) forms an island phase, and that the number average dispersed particle size of the polyamide resin (b) is less than 500 nm.
2. A polyphenylene sulfide resin, according to 1, wherein the melt viscosity of polyphenylene sulfide resin (a) is 100 Pa·s (under conditions of 310° C. and shear rate 1000/s) or more.
3. A polyphenylene sulfide resin composition, according to 1 or 2, wherein after the polyphenylene sulfide resin composition is melted and allowed to reside at 300° C. for 30 minutes, the number average dispersed particle size of the polyamide resin (b) is kept at less than 500 nm.
4. A polyphenylene sulfide resin composition, according to any one of 1 through 3, wherein the polyamide resin (b) has 6 to less than 11 carbon atoms per one amide group in each of the recurring units constituting the polyamide.
5. A polyphenylene sulfide resin composition, according to any one of 1 through 4, wherein polyamide resin (b) is a copolyamide, nylon 610 or nylon 612.
6. A polyphenylene sulfide resin composition, according to any one of 1 through 5, wherein a compound having one or more types of groups selected from epoxy group, amino group and isocyanate group is added by 0.1 to 10 parts by weight per 100 parts by weight in total of the polyphenylene sulfide resin (a) and the polyamide resin (b), as a compatibilizing agent (c) for the polyphenylene sulfide resin (a) and the polyamide resin (b).
7. A polyphenylene sulfide resin composition, according to any one of 1 through 4, which has a tensile elongation of 80% or more.

DETAILED DESCRIPTION

We provide a polyphenylene sulfide resin composition very excellent in the toughness typified by tensile elongation.

(1) PPS Resin

The PPS resin (a) is a polymer having recurring units, each of which is represented by the following structural formula:

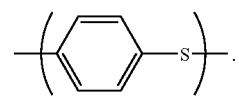

Chemical Formula 1

In view of heat resistance, a polymer containing 70 mol % or more of recurring units, each of which is represented by the structural formula, is preferred. More preferred is a polymer containing 90 mol % or more of the recurring units. Further, the PPS resin may contain less than about 30 mol % of recurring units, each of which is represented by any of the following structures:

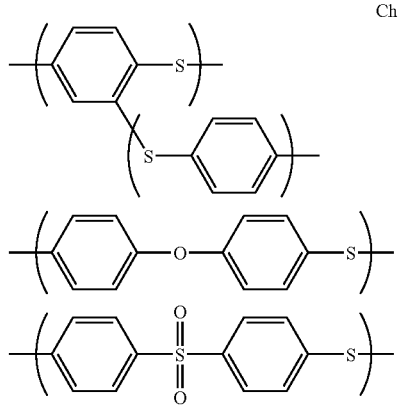

Chemical Formulae 2

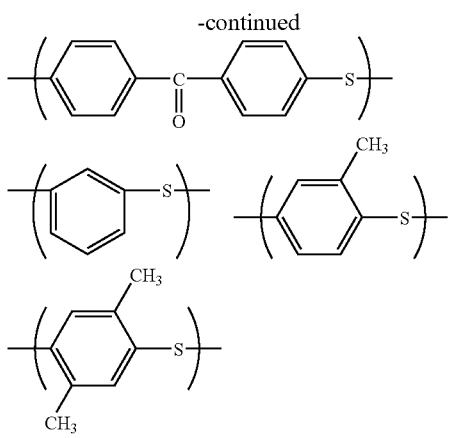

Since a PPS copolymer partially having such a structure has a low melting point, the resin composition containing it is advantageous in view of moldability.

The melt viscosity of the PPS resin (a) is not especially limited, but for obtaining more excellent toughness, it is preferred that the melt viscosity is higher. For example, a melt viscosity of 100 Pa·s (310° C., shear rate 1000/s) or more is preferred, and more preferred is 150 Pa·s or more. It is preferred in view of retaining melt flowability that the upper limit is 600 Pa·s or less.

Meanwhile, the melt viscosity refers to a value measured under conditions of 310° C. and shear rate 1000/s using Capillograph produced by Toyo Seiki Seisaku-sho, Ltd.

The method for producing the PPS resin (a) is described below. At first, the polyhalogenated aromatic compound, sulfidizing agent, polymerization solvent, molecular weight modifier, polymerization modifier compound and polymerization stabilizer used in the production method are described below.

Polyhalogenated Aromatic Compound

The polyhalogenated aromatic compound refers to a compound having two or more halogen atoms per one molecule. Examples of it include polyhalogenated aromatic compounds such as p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichlorop-p-xylene, 1,4-dibormobenzene, 1,4-diiodobenzene, and 1-methoxy-2,5-dichloro-benzene. Preferably used is p-dichlorobenzene. Further, different two or more polyhalogenated aromatic compounds can also be used in combination as a copolymer, but it is preferred that a p-dihalogenated aromatic compound is a major component.

The amount of the polyhalogenated aromatic compound used is 0.9 to 2.0 moles for each mole of the sulfidizing agent in view of obtaining a PPS resin with a viscosity suitable for processing. A preferred range is 0.95 to 1.5 moles, and a more preferred range is 1.005 to 1.2 moles.

Sulfidizing Agent

The sulfidizing agent can be an alkali metal sulfide, alkali metal hydrosulfide, or hydrogen sulfide.

Examples of the alkali metal sulfide include lithium sulfide, sodium sulfide, potassium sulfide, rubidium sulfide, cesium sulfide and mixtures comprising two or more of the foregoing. Among them, sodium sulfide can be preferably used. Any of these alkali metal sulfides can be used as a hydrate, aqueous mixture or anhydride.

Examples of the alkali metal hydrosulfide include sodium hydrosulfide, potassium hydrosulfide, lithium hydrosulfide, rubidium hydrosulfide, cesium hydrosulfide and mixtures comprising two or more of the foregoing. Among them, sodium hydrosulfide can be preferably used. Any of these alkali metal hydrosulfides can be used as a hydrate, aqueous mixture or anhydride.

Further, an alkali metal sulfide prepared from an alkali metal hydrosulfide and an alkali metal hydroxide in situ in a reaction system can also be used. Furthermore, an alkali metal sulfide can be prepared from an alkali metal hydrosulfide and an alkali metal hydroxide and transferred into a polymerization vessel, to be used.

Moreover, an alkali metal sulfide prepared from an alkali metal hydroxide such as lithium hydroxide or sodium hydroxide and hydrogen sulfide in situ in a reaction system can also be used. Furthermore, an alkali metal sulfide can be prepared from an alkali metal hydroxide such as lithium hydroxide or sodium hydroxide and hydrogen sulfide and transferred into a polymerization vessel, to be used.

With regard to the amount of the sulfidizing agent supplied, in the case where the sulfidizing agent is partially lost due to dehydration operation or the like before start of polymerization reaction, the supplied amount means the amount obtained by subtracting the loss from the actually supplied amount.

Meanwhile, an alkali metal hydroxide and/or an alkaline earth metal hydroxide can also be used together with the sulfidizing agent. Preferred examples of the alkali metal hydroxide include sodium hydroxide, potassium hydroxide, lithium hydroxide, rubidium hydroxide, cesium hydroxide and mixtures comprising two or more of the foregoing. Examples of the alkaline earth metal hydroxide include calcium hydroxide, strontium hydroxide, barium hydroxide, etc., and among them, sodium hydroxide can be preferably used.

In the case where an alkali metal hydrosulfide is used as the sulfidizing agent, it is especially preferred to use an alkali metal hydroxide simultaneously. The amount of the alkali metal hydroxide used should be 0.95 to 1.20 moles for each mole of the alkali metal hydrosulfide. A preferred range is 1.00 to 1.15 moles, and a more preferred range is 1.005 to 1.100 moles.

Polymerization Solvent

An organic polar solvent is used as the polymerization solvent. Examples of it include N-alkylpyrrolidones such as N-methyl-2-pyrrolidone and N-ethyl-2-pyrrolidone, caprolactams such as N-methyl-ε-caprolactam, aprotic organic solvents typified by 1,3-dimethyl-2-imidazolidinone, N,N-dimethylacetamide, N,N-dimethylformamide, hexamethyl phosphoric acid triamide, dimethylsulfone, tetramethylene sulfoxide, etc., mixtures thereof, etc. Any of them can be preferably used, since they are high in reaction stability. Among them, especially N-methyl-2-pyrrolidone (hereinafter this compound may be abbreviated as NMP) can be preferably used.

The amount of the organic polar solvent used is 2.0 to 10 moles for each mole of the sulfidizing agent. A preferred range is 2.25 to 6.0 moles, and a more preferred range is 2.5 to 5.5 moles.

Molecular Weight Modifier

To form the ends of the PPS resin produced or for adjusting the polymerization reaction or molecular weight, a monohalogen compound (not necessarily an aromatic compound) can be used together with the polyhalogenated aromatic compound.

Polymerization Modifier Compound

It is preferred to use a polymerization modifier compound for obtaining a PPS resin with a relatively high polymerization degree in a shorter period of time. The polymerization modifier compound means a substance with an action to increase the viscosity of the polyarylene sulfide resin obtained. Examples of the polymerization modifier compound include organic carboxylates, water, alkali metal chlorides, organic sulfonates, alkali metal sulfates, alkaline earth metal oxides, alkali metal phosphates, alkaline earth metal phosphates, etc. Any one of them can be used alone, or two or more of them can also be used simultaneously. Among them, an organic carboxylate and/or water or lithium chloride can be preferably used.

Any of the alkali metal carboxylates is a compound represented by general formula R(COOM)n (where R is an alkyl group with 1 to 20 carbon atoms, cycloalkyl group, aryl group, alkylaryl group or arylalkyl group; M is an alkali metal selected from lithium, sodium, potassium, rubidium and cesium; and n is an integer of 1 to 3). The alkali metal carboxylate can also be used as a hydrate, anhydride or aqueous solution. Examples of the alkali metal carboxylate include lithium acetate, sodium acetate, potassium acetate, sodium propionate, lithium valerate, sodium benzoate, sodium phenylacetate, potassium p-toluylate, mixtures thereof, etc.

Any of the alkali metal carboxylates can also be formed by adding about an equal chemical equivalent each of an organic acid and one or more compounds selected from the group consisting of alkali metal hydroxides, alkali metal carbonates and alkali metal bicarbonates, for letting them react with each other. Among The alkali metal carboxylates, a lithium carboxylate can be highly dissolved in the reaction system, to show a high aid effect but is expensive. Potassium, rubidium and cesium carboxylates are considered to be only insufficiently dissolvable in the reaction system. So, inexpensive sodium acetate moderately soluble in the polymerization system can be most preferably used.

In the case where any of these alkali metal carboxylates is used as the polymerization modifier compound, the amount of it is usually in a range from 0.01 to 2 moles for each mole of the supplied alkali metal sulfide. A preferred range for obtaining a higher polymerization degree is 0.1 to 0.6 mole and a more preferred range is 0.2 to 0.5 mole.

In the case where water is used as a polymerization modifier compound, the amount of it added is usually in a range from 0.3 to 15 moles for each mole of the supplied alkali metal sulfide. A preferred range for obtaining a higher polymerization degree is 0.6 to 10 moles, and a more preferred range is 1 to 5 moles.

Two or more of these polymerization modifier compounds can, of course, be used together, and if an alkali metal carboxylate and water are used together for example, respectively smaller amounts of them allow the molecular weight to be enhanced.

The time when any of these polymerization modifier compounds is added is not especially specified. It can be added at any time during the pre-polymerization step described later, at the start of polymerization or during polymerization. It can also be added plural times. However, in the case where an alkali metal carboxylate is used as the polymerization modifier compound, it is preferred to add at a time at the start of pre-polymerization step or at the start of polymerization, since the addition is easy. Further, in the case where water is used as a polymerization modifier compound, it is effective to add during polymerization reaction after supplying the polyhalogenated aromatic compound.

Polymerization Stabilizer

For stabilizing the polymerization system and preventing side reactions, a polymerization stabilizer can also be used. The polymerization stabilizer contributes to the stabilization of the polymerization reaction system and inhibits unwanted side reactions. One of the side reactions is the production of thiophenol, and if a polymerization stabilizer is added, the production of thiophenol can be inhibited. Examples of the polymerization stabilizer include such compounds as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferred. Since alkali metal carboxylates can also act as polymerization stabilizers, they are included in the polymerization stabilizers that can be used. Further, in the case where an alkali metal hydrosulfide is used as the sulfidizing agent, it is especially preferred to use an alkali metal hydroxide simultaneously as described before, and if the amount of the alkali metal hydroxide added is excessive for the sulfidizing agent, it can also act as a polymerization stabilizer.

Any one of these polymerization stabilizers can be used alone or two or more of them can also be used in combination. The amount of the polymerization stabilizer is usually 0.02 to 0.2 mole for each mole of the supplied alkali metal sulfide. A preferred range is 0.03 to 0.1 mole, and a more preferred range is 0.04 to 0.09 mole. If the amount of the polymerization stabilizer is too small, the stabilization effect is insufficient. If it is too large on the contrary, economical disadvantage is incurred, and the polymer yield tends to decline.

The time when the polymerization stabilizer is added is not especially specified, and it can be added at any time during the pre-polymerization step described later, at the start of polymerization or during polymerization. It can also be added plural times. However, it is more preferred to add at a time at the start of pre-polymerization step or at the start of polymerization, since the addition is easy.

Next, the method for producing the PPS resin (a) is described below particularly in the order of pre-polymerization step, polymerization reaction step, recovery step and post-treatment step.

Pre-Polymerization Step

In the method for producing the PPS resin (a), the sulfidizing agent is usually used as a hydrate, but it is preferred to heat the mixture containing the organic polar solvent and the sulfidizing agent for removing the excessive amount of water outside the system before the polyhalogenated aromatic compound is added.

Further, as described before, a sulfidizing agent prepared from an alkali metal hydrosulfide and an alkali metal hydroxide in situ in the reaction system or prepared in a vessel different from the polymerization vessel can also be used as the sulfidizing agent. This method is not especially limited. As a desirable method, an alkali metal hydrosulfide and an alkali metal hydroxide are added to an organic polar solvent in an inert gas atmosphere in a temperature range from room temperature to 150° C. or preferably from room temperature to 100° C., and the mixture is heated to at least 150° C. or higher, preferably to a range from 180 to 260° C. at atmospheric pressure or reduced pressure, for distilling away water. The polymerization modifier compound can also be added at this stage. Furthermore, for promoting the removal of water by distillation, toluene or the like can also be added to perform the reaction.

It is preferred that the water content in the polymerization system during the polymerization reaction is 0.3 to 10.0 moles for each mole of the supplied sulfidizing agent. The water content in the polymerization system in this case refers to the amount of water obtained by subtracting the amount of water removed outside the polymerization system from the amount of water supplied into the polymerization system.

Further, the water supplied can be in any state of liquid water, aqueous solution, crystal water, etc.

Polymerization Reaction Step

A sulfidizing agent and a polyhalogenated aromatic compound are made to react with each other in an organic polar solvent in a temperature range from 200° C. to lower than 290° C., for producing a PPS resin.

For starting the polymerization reaction step, the organic polar solvent, the sulfidizing agent and the polyhalogenated aromatic compound are mixed desirably in an inert gas atmosphere in a temperature range from room temperature to 240° C., preferably 100 to 230° C. The polymerization modifier compound can also be added at this stage. The order of adding these raw materials can be at random or simultaneously.

The mixture is usually heated to a range from 200° C. to 290° C. The heating rate is not especially limited, but is usually selected in a range from 0.01 to 5° C./min. A preferred range is 0.1 to 3° C./min.

In general, the mixture is heated finally to a temperature of 250 to 290° C. to perform the reaction at the temperature usually for 0.25 to 50 hours, preferably 0.5 to 20 hours.

A method of performing the reaction, for example, at 200° C. to 260° C. for a certain period of time at the stage before reaching the final temperature and then heating to a temperature of 270 to 290° C. is effective for obtaining a higher polymerization degree. In this case, the reaction time at 200° C. to 260° C. is usually selected in a range from 0.25 hour to 20 hours, preferably 0.25 to 10 hours.

Meanwhile, for obtaining a polymer with a high polymerization degree, it may be effective to polymerize at plural stages. For polymerization at plural stages, it is effective to select the point of time when the conversion of the polyhalogenated aromatic compound in the system at 245° C. reaches 40 mol % or more, preferably 60 mol %.

Meanwhile, the conversion of the polyhalogenated aromatic compound (abbreviated as PHA here) refers to a value calculated from the following formula. The remaining amount of PHA can be usually obtained by gas chromatography.

(a) In the case where the polyhalogenated aromatic compound is added at an excessive molar ratio to the alkali metal sulfide:

Conversion=(Amount of PHA supplied (moles)−Remaining amount of PHA (moles))/(Amount of PHA supplied (moles)−Excessive amount of PHA (moles))

(b) In the other case than (a):

Conversion=(Amount of PHA supplied (moles)−Remaining amount of PHA (moles))/(Amount of PHA supplied (moles))

Recovery Step

In the method for producing the PPS resin (a), a solid is recovered from the polymerization reaction product containing the polymer, solvent, etc. after completion of polymerization. The PPS resin can be recovered by any publicly known method.

For example, a method of recovering a granular polymer by gradual cooling after completion of polymerization reaction can also be used. In this case, the gradual cooling rate is not especially limited, but is usually about 0.1° C./min to about 3° C./min. It is not necessary to gradually cool at a constant rate throughout the gradual cooling step. For example, a method of gradually cooling at 0.1 to 1° C./min till polymer particles are precipitated, and subsequently at 1° C. or higher can also be employed.

It is also preferred to recover the PPS resin under quick cooling conditions. One of the preferred recovery methods under such conditions is flush method. The flush method refers to flush method the polymerization reaction product from a state of high temperature and high pressure (usually 250° C. or higher and 8 kg/cm$^2$ or higher) into an atmosphere of atmospheric pressure or reduced pressure, for recovering the polymer as a powder simultaneously with the recovery of the solvent. The flush method in this case means to jet the polymerization reaction product from a nozzle. The atmosphere into which the reaction product is flushed is particularly, for example, nitrogen or water vapor of atmospheric pressure, and the temperature is usually selected in a range from 150° C. to 250° C.

Post-Treatment Step

The PPS resin (a) produced after undergoing the polymerization step and the recovery step can also be treated with an acid, treated with hot water or washed with an organic solvent.

If the acid treatment is employed, it can be performed as follows. The acid used for the acid treatment of the PPS resin is not especially limited, if it does not act to decompose the PPS resin. Examples of it include acetic acid, hydrochloric acid, sulfuric acid, phosphoric acid, silicic acid, carbonic acid, propylic acid, etc. Among them, acetic acid and hydrochloric acid can be more preferably used. An acid capable of decomposing or deteriorating the PPS resin, such as nitric acid, is not preferred.

The acid treatment can be performed, for example, by a method of immersing the PPS resin in an acid or an acid aqueous solution, and as required, stirring or heating can also be used. For example, in the case where acetic acid is used, if the PPS resin powder is immersed in an aqueous solution of pH 4 heated to a temperature of 80 to 200° C. and is stirred for 30 minutes, a sufficient effect can be obtained. After completion of treatment, the pH can also be 4 or higher, for example, about 4 to about 8. It is preferred that the PPS resin treated with an acid is washed with cold or hot water several times to remove the remaining acid, salt, etc. It is preferred that the water used for washing is distilled water or deionized water, since the preferred effect of chemically modifying the PPS resin by acid treatment is not impaired.

If the hot water treatment is employed, it can be performed as follows. When the hot water treatment is applied to the PPS resin, the hot water temperature is 100° C. or higher. More preferred is 120° C. or higher, and further more preferred is 150° C. or higher. Especially preferred is 170° C. or higher. It is not preferred that the temperature is lower than 100° C., since the preferred effect of chemically modifying the PPS resin is small.

For exhibiting the preferred effect of chemically modifying the PPS resin by the hot water washing, it is preferred that the water used is distilled water or deionized water. The operation of hot water treatment is not especially limited, and a method in which a predetermined amount of the PPS resin is added into a predetermined amount of water, being followed by heating and stirring in a pressure vessel, or a method in which hot water treatment is applied continuously, etc. can be employed. As for the ratio of the PPS resin and water, it is preferred that the amount of water is larger. Usually a bath ratio of 200 g or less of the PPS resin for 1 liter of water is selected.

Further, since the decomposition of end groups is not preferred, it is desirable that the treatment atmosphere is an inert atmosphere for avoiding it. Furthermore, it is preferred that the PPS resin treated with hot water is washed with hot water several times for removing the remaining components.

If an organic solvent is used for washing, it can be performed as follows. The organic solvent used for washing the PPS resin is not especially limited, if it does not act to decompose the PPS resin, etc. Examples of the organic solvent include nitrogen-containing polar solvents such as N-methyl-2-pyrrolidone, dimethylformamide, dimethylacetamide, 1,3-dimethylimidazolidinone, hexamethyl phosphorus amide and piperazinones, sulfoxide/sulfone solvents such as dimethyl sulfoxide, dimethylsulfone and sulfolane, ketone solvents such as acetone, methyl ethyl ketone, diethyl ketone and acetophenone, ether solvents such as dimethyl ether, dipropyl ether, dioxane and tetrahydrofuran, halogen solvents such as chloroform, methylene chloride, trichloroethylene, dichloroethylene, perchloroethylene, monochloroethane, dichloroethane, tetrachloroethane, perchloroethane and chlorobenzene, alcohol/phenol solvents such as methanol, ethanol, propanol, butanol, pentanol, ethylene glycol, propylene glycol, phenol, cresol, polyethylene glycol and polypropylene glycol, aromatic hydrocarbon solvents such as benzene, toluene and xylene. Among these organic solvents, it is especially preferred to use N-methyl-2-pyrrolidone, acetone, dimethylformamide, chloroform, etc. Further, one of these organic solvents can be used, or two or more of them can also be used as a mixture.

The PPS resin can be washed with an organic solvent, for example, by a method of immersing the PPS resin into the organic solvent, and as required, stirring or heating can also be used. When the PPS resin is washed with the organic solvent, the washing temperature is not especially limited, and any desired temperature can be selected in a range from room temperature to about 300° C. If the washing temperature is higher, the washing efficiency tends to be higher, but usually at a washing temperature of room temperature to 150° C., a sufficient effect can be obtained. Washing can also be performed at a temperature higher than the boiling point of the organic solvent under pressurization in a pressure vessel. Further, the washing time is not especially limited either. In the case of batch washing, though depending on washing conditions, washing for more than 5 minutes can usually provide a sufficient effect. Continuous washing can also be employed.

After completion of polymerization, the PPS resin (a) can also be heated in oxygen atmosphere or heated after adding a crosslinking agent such as a peroxide for thermal oxidation crosslinking treatment, to be larger in molecular weight.

In the case where dry heat treatment is performed for the purpose of increasing the molecular weight by thermal oxidation treatment, it is preferred that the temperature is 160 to 260° C. A more preferred range is 170 to 250° C. It is desirable that the oxygen concentration is 5 vol % or more. More desirable is 8 vol % or more. The upper limit of oxygen concentration is not especially limited, but is about 50 vol %. It is preferred that the treatment time is 0.5 to 100 hours. A more preferred range is 1 to 50 hours, and a further more preferred range is 2 to 25 hours. The device for heat treatment can be an ordinary hot air dryer, or a rotary heater or a heater with stirring blades. However, in the case where efficient and more homogeneous treatment is intended, it is more preferred to use a rotary heater or a heater with stirring blades.

Further, dry heat treatment can also be performed for the purposes of inhibiting the thermal oxidation crosslinking and removing the volatile content. It is preferred that the temperature is 130 to 250° C. A more preferred range is 160 to 250° C. Further, it is desirable that the oxygen concentration in this case is less than 5 vol %. More desirable is less than 2 vol %. It is preferred that the treatment time is 0.5 to 50 hours. A more preferred range is 1 to 20 hours, and a further more preferred range is 1 to 10 hours. The device for heat treatment can be an ordinary hot air dryer, or a rotary heater or a heater with stirring blades. In the case where efficient and more homogeneous treatment is intended, it is more preferred to use a rotary heater or a heater with stirring blades.

However, it is preferred that the polyamide resin (a) is substantially a straight chain PPS not increased in molecular weight by thermal oxidation crosslinking treatment, for achieving the intended excellent toughness.

(2) Polyamide Resin

The polyamide resin (b) is not especially limited, if it is a publicly known polyamide resin excluding nylon 46. In general, it is a polyamide mainly with an amino acid, lactam or diamine and a dicarboxylic acid as major components. Typical examples of the major components include amino acids such as 6-aminocaproic acid, 11-aminoundecanoic acid, 12-aminododecanoic acid and para-aminomethylbenzoic acid, lactams such as ε-aminocaprolactam and ω-laurolactam, aliphatic, alicyclic and aromatic diamines such as tetramethylenediamine, hexamethylenediamine, undecamethylenediamine, dodecamethylenediamine, 2,2,4-/2,4,4-trimethylhexamethylenediamine, 5-methylnonamethylenediamine, meta-xylenediamine, para-xylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine and 2-methylpentamethylenediamine, aliphatic, alicyclic and aromatic dicarboxylic acids such as adipic acid, suberic acid, azelaic acid, sebacic acid, dodecanoic diacid, terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid. Any one of the polyamide homopolymers and copolymers derived from these raw materials can be used, or two or more of them can also be used as a mixture.

The polyamide resins include homopolyamide resins such as polycaproamide (nylon 6), polyhexamethylene adipamide (nylon 66), polyhexamethylene sebacamide (nylon 610), poly-hexamethylene dodecamide (nylon 612), polydodecaneamide (nylon 12), polyandecaneamide (nylon 11), polyhexamethylene terephthalamide (nylon 6T) and polyxylylene adipamide (nylon XD6) and copolyamides as copolymers thereof (nylon 6/66, nylon 6/10, nylon 6/66/610 and 66/6T), etc. Among them, a copolyamide is preferred. These polyamide resins can also be used as a mixture ("/" expresses copolymerization; hereinafter this applies).

Among the above, nylon 6 as a homopolyamide resin or a copolyamide obtained by copolymerizing nylon 6 and another polyamide component can be preferably used, since excellent toughness can be exhibited. Especially a nylon 6/66 copolymer has a high effect of exhibiting toughness, and a nylon 6/66 copolymer in which the amount of nylon 6 copolymerized is larger than that of nylon 66 copolymerized can be especially preferably used. It is especially preferred that the copolymerization ratio by weight of nylon 6/66 copolymer is in a range of nylon 6 component/nylon 66 component=95/5 to 65/35.

Further, since nylon 610 and nylon 612 have excellent thermal stability and relatively high strength, they are also preferred polyamides.

On the other hand, a polyamide with 11 or more carbon atoms per one amide group in each of the recurring units constituting the polyamide of the polyamide resin (b), for example, polyamide 11 or polyamide 12, etc. is not preferred, if it is intended to obtain especially excellent toughness. The reason is estimated to be that since the interaction between PPS and a polyamide is the interaction between PPS and amide groups, the affinity with PPS declines if the amide group concentration is too low.

Meanwhile, it is not preferred to use nylon 46 as the polyamide. The reason is not clear, but the effect of exhibiting toughness intended greatly declines.

Therefore, the preferred polyamide resin (b) has 6 to less than 1 carbon atoms per one amide group in each of the recurring units constituting the polyamide.

The polymerization degree of the polyamide is not especially limited, but it is preferred that the relative viscosity of the polyamide measured in concentrated sulfuric acid at a concentration of 1% and at 25° C. is 1.5 or more, since more excellent toughness can be exhibited. It is more preferred to use a polyamide with a relative viscosity of 1.8 to 5.5.

The amount of the mixed polyamide resin (b) is selected to ensure that 99 to 60 wt % of the PPS resin (a) and 1 to 40 wt % of the polyamide resin (b) are used to make 100 wt % as the total of the ingredients (a) and (b). It is more preferred that 98 to 70 wt % of the PPS resin (a) and 2 to 30 wt % of the polyamide resin are used, and it is further more preferred that 96 to 75 wt % of the PPS resin (a) and 4 to 25 wt % of the polyamide resin are used. It is not preferred that the amount of the polyamide resin (b) is more than 40 wt %, since the excellent properties such as wet heat resistance of the PPS resin are impaired. It is not preferred either that the amount of the polyamide resin (b) is less than 1 wt %, since the effect of exhibiting toughness remarkably declines.

(3) Compatibilizing Agent

For exhibiting more excellent toughness, it is preferred to add 0.1 to 10 parts by weight of a compound with one or more types of groups selected from epoxy group, amino group and isocyanate group as a compatibilizing agent (c) per 100 parts by weight in total of the polyphenylene sulfide (a) and the polyamide resin (b).

Examples of the compatibilizing agent (c) include glycidyl ethers of bisphenols such as bisphenol A, resorcinol, hydroquinone, pyrocatechol, bisphenol F, saligenin, 1,3,5-trihydroxybenzene, bisphenol S, trihydroxy-diphenyldimethylmethane, 4,4'-dihydroxybiphenyl, 1,5-dihydroxynaphthalene, cashew phenol and 2,2,5,5-tetrakis(4-hydroxyphenyl)hexane, those using a halogenated bisphenol instead of a bisphenol, glycidyl epoxy resins, for example, epoxy compounds based on a glycidyl ether such as butanediol diglycidyl ether, compounds based on a glycidyl ester such as phthalic acid glycidyl ester, and compounds based on a glycidylamine such as N-glycidylaniline, linear epoxy compounds such as epoxylated polyolefins and epoxylated soybean oil, cyclic non-glycidyl epoxy resins such as vinylcyclohexene dioxide and dicyclo-pentadiene dioxide.

Further, novolak epoxy resins can also be used. A novolak epoxy resin has two or more epoxy groups and is obtained by letting epichlorohydrin react with an ordinary novolak phenol resin. Furthermore, a novolak phenol resin can be obtained by condensation reaction between a phenol and formaldehyde. The phenol used as a raw material is not especially limited, and examples of it include phenol, o-cresol, m-cresol, p-cresol, bisphenol A, resorcinol, p-tertiary-butylphenol, bisphenol F, bisphenol S, and condensation products thereof.

Moreover, olefin copolymers having epoxy groups can also be used. The olefin copolymers having epoxy groups (epoxy group-containing olefin copolymers) include olefin copolymers obtained by introducing a monomer component with an epoxy group into an olefin (co)polymer. Further, a copolymer obtained by epoxylating the double bond portions of an olefin polymer having double bonds in the main chain can also be used.

Examples of the functional group-containing component used for introducing a monomer component having an epoxy group into an olefin (co)polymer include monomers containing an epoxy group such as glycidyl acrylate, glycidyl methacrylate, glycidyl ethacrylate, glycidyl itaconate and glycidyl citraconate.

The method for introducing any of these epoxy group-containing components is not especially limited. For example, a method of copolymerizing it with an α-olefin, etc. and a method of using a radical initiator for grafting into an olefin (co)polymer can be used.

The adequate amount of the monomer component containing an epoxy group to be introduced is 0.001 to 40 mol % based on the amount of all the monomers used as the raw materials of the epoxy group-containing olefin copolymer. A preferred range is 0.01 to 35 mol %.

An epoxy group-containing olefin copolymer is preferably an olefin copolymer containing an α-olefin and an α,β-unsaturated carboxylic acid glycidyl ester as copolymerization components. As said α-olefin, ethylene is especially preferred.

Further, such a copolymer can also be copolymerized with an α,β-unsaturated carboxylic acid or any of alkyl esters thereof such as acrylic acid, methyl acrylate, ethyl acrylate, butyl acrylate, methacrylic acid, methyl methacrylate, ethyl methacrylate or butyl methacrylate, styrene, acrylonitrile, etc.

Furthermore, the olefin copolymer can be of any mode of random, alternating, block or graft copolymerization.

Among the olefin copolymers obtained by copolymerizing an α-olefin and an α,β-unsaturated carboxylic acid glycidyl ester, an olefin copolymer obtained by copolymerizing 60 to 99 wt % of an α-olefin and 1 to 40 wt % of an α,β-unsaturated carboxylic acid glycidyl ester is especially preferred.

The α,β-unsaturated carboxylic acid glycidyl ester is a compound represented by the following formula:

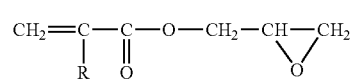

Chemical Formula 3

(where R is a hydrogen atom or lower alkyl group). Examples of it include glycidyl acrylate, glycidyl methacrylate, glycidyl ethacrylate, etc. Among them, glycidyl methacrylate can be preferably used.

Examples of the olefin copolymer containing an α-olefin and an α,β-unsaturated carboxylic acid glycidyl ester as essential copolymer components include ethylene/propylene-g-glycidyl methacrylate copolymer ("g" expresses graft; hereinafter this applies), ethylene/butene-1-g-glycidyl methacrylate copolymer, ethylene-glycidyl methacrylate copolymer-g-polystyrene, ethylene-glycidyl methacrylate copolymer-g-acrylonitrile-styrene copolymer, ethylene-glycidyl methacrylate copolymer-g-PMMA, ethylene/glycidyl acrylate copolymer, ethylene/glycidyl methacrylate copolymer, ethylene/methyl acrylate/glycidyl methacrylate copolymer and ethylene/methyl methacrylate/glycidyl methacrylate copolymer.

Further other examples of the compatibilizing agent (c) include alkoxysilanes having one or more types of functional groups selected from epoxy group, amino group and isocyanate group. Examples of the compounds include epoxy group-containing alkoxysilane compounds such as γ-glycidoxypropyltrimethoxysilane, γ-glycidoxypropyltriethoxysilane, and β-(3,4-epoxy-cyclohexyl)ethyltrimethoxysilane, ureido group-containing alkoxysilane compounds such as γ-ureidopropyltriethoxysilane, γ-ureidopropyltrimethoxysilane, and γ-(2-ureidoethyl)aminopropyl-trimethoxysilane, isocyanato group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane, amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane.

Other examples of the compatibilizing agent (c) include isocyanate compounds such as 2,4-tolylenediisocyanate, 2,5-tolylenediisocyanate, diphenylmethane-4,4'-diisocyanate and polymethylene polyphenyl polyisocyanate.

The amount of the compatibilizing agent (c) added is 0.1 to 10 parts by weight per 100 parts by weight in total of the polyphenylene sulfide (a) and the polyamide resin (b). A preferred range is 0.2 to 5 parts by weight.

(4) Other additives

Further, a resin other than polyamide resins can also be added to the PPS resin composition to such an extent that the effect is not impaired. Examples of it include polybutylene terephthalate resins, polyethylene terephthalate resins, modified polyphenylene ether resins, polysulfone resins, polyallyl sulfone resins, polyketone resins, polyetherimide resins, polyallylate resins, liquid crystal polymers, polyethersulfone resins, polyetherketone resins, polythioetherketone resins, polyetheretherketone resins, polyimide resins, polyamideimide resins, polyethylene tetrafluoride resins, etc.

Furthermore, for the purpose of modification, the following compounds can be added: plasticizers such as polyalkylene oxide oligomer compounds, thioether compounds, ester compounds and organic phosphorus compounds, crystal nucleating agents such as talc, kaolin, organic phosphorus compounds and polyetheretherketones, metal soaps such as montanic acid waxes, lithium stearate and aluminum stearate, releasing agents such as ethylenediamine-stearic acid-sebacic acid polycondensation product and silicone compounds, coloration preventives such as hypophosphites, lubricants, ultraviolet light absorbers, colorants, foaming agents, etc. It is not preferred that the amount of any of the compounds is more than 20 wt % based on the weight of the entire composition, since the properties peculiar to the PPS resin are impaired. Preferred is 10 wt % or less, and more preferred is 1 wt % or less.

A filler can also be mixed with the PPS resin composition obtained by the method to such an extent that the effect is not impaired. Examples of the filler include fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metallic fibers, and non-fibrous fillers, for example, fullerene, silicates such as talc, wollastonite, zeolite, sericite, mica, kaolin, clay, pyrophyllite, bentonite, asbestos and alumina silicate, metal compounds such as silicon oxide, magnesium oxide, alumina, zirconium oxide, titanium oxide and iron oxide, carbonates such as calcium carbonate, magnesium carbonate and dolomite, sulfates such as calcium sulfate and barium sulfate, hydroxides such as calcium hydroxide, magnesium hydroxide and aluminum hydroxide, glass beads, glass flakes, glass powder, ceramic beads, boron nitride, silicon carbide, carbon black, silica, graphite, etc. They can also be hollow. Two or more of the fillers can also be used together. Further, any of these fillers can also be preliminarily treated by a coupling agent such as an isocyanate compound, organic silane compound, organic titanate compound, organic borane compound or epoxy compound, for use as a filler.

Morphology

The PPS resin composition has the excellent heat resistance, chemicals resistance and barrier properties peculiar to the PPS resin and also has excellent toughness. To exhibit these properties, it is necessary that the PPS resin forms a sea phase (continuous phase or matrix) while the polyamide resin forms an island phase (dispersed phase). Further, it is necessary that the number average dispersed particle size of the polyamide resin is less than 500 nm. Preferred is 300 nm or less, and more preferred is 200 nm or less. It is preferred in view of productivity that the lower limit is 1 nm or more. Since the PPS resin forms a continuous phase, the excellent properties such as barrier properties, chemical resistance and heat resistance of PPS can be substantially exhibited as the properties of the obtained composition.

Meanwhile, the average dispersed particle size refers to the number average dispersed particle size obtained by preparing an ASTM No. 4 specimen by molding a PPS resin at a molding temperature of the melting peak temperature of the PPS resin+20° C., cutting it at the central portion of it in the cross sectional direction at −20° C. to obtain a 0.1 μm or thinner dumbbell specimen, observing arbitrary 100 dispersed portions of the polyamide resin at a magnification of 20,000 times with a transmission electron microscope, measuring the maximum size and the minimum size of each of the dispersed portions, averaging them respectively, and finally obtaining an average value.

Further, in the case where the resin composition is molded to produce a large molded article taking a long melt residence time or to produce a film or the like taking a long melt residence time, it is one of preferred properties that after the polyphenylene sulfide resin composition is melted and allowed to reside at 300° C. for 30 minutes, the number average dispersed particle size of the polyamide resin (b) is less than 500 nm.

The number average dispersed particle size of the polyamide resin (b) after completion of melt residence refers to the number average dispersed particle size obtained, as described above, by preparing an ASTM No. 4 specimen, letting it reside in vacuum at 300° C. for 30 minutes, cooling, cutting it at the central portion of it in the cross sectional area direction at −20° C. to obtain a 0.1 μm or thinner dumbbell specimen, observing arbitrary 100 dispersed portions of the polyamide resin at a magnification of 20,000 times with a transmission electron microscope, measuring the maximum size and the minimum size of each of the dispersed portions, averaging them respectively, and finally obtaining an average value.

It is preferred that the number average dispersed particle size of the polyamide resin after completion of melt residence is less than 500 nm. More preferred is 300 nm or less, and further more preferred is 200 nm or less. In view of productivity, it is preferred that the lower limit is 1 nm or more.

Kneading Method

As a typical kneading method, the raw materials are supplied into a publicly known ordinary melt kneading machine such as a single screw or double screw extruder, Banbury mixer, kneader or mixing roll mill and kneaded at a processing temperature of the melting peak temperature of the PPS resin+5 to 100° C. For more finely dispersing the polyamide resin, a relatively strong shear force is preferred. Particularly preferred is a method of using a double screw extruder with two or more kneading portions for kneading to ensure that the resin temperature during mixing may become the melting peak temperature of the PPS resin+10 to 70° C. In this case, the order of mixing the raw materials is not especially limited, and any of the following methods can be used: a method in which all the raw materials are mixed and melt-kneaded by the above-mentioned method; a method in which some raw materials are mixed and melt-kneaded by the above-mentioned method, and the remaining raw materials are mixed and melt-kneaded; a method in which some raw materials are mixed and while the mixture is melt-kneaded by a single screw or double screw extruder, the remaining raw materials are mixed using a side feeder. Further, with regard to minor additives, after the other ingredients are kneaded and pelletized by the above-mentioned method, etc., the minor additives can be added before molding, of course.

EXAMPLES

Compositions are described below more particularly in reference to examples.

In the following examples, the material properties were measured according to the following methods.

Tensile Test

Sumitomo Nestal Injection Molding Machine SG75 was used to prepare an ASTM No. 4 dumbbell specimen at a resin temperature of 300° C. and at a mold temperature of 150° C. For measurement, Tensilon UTA 2.5 T Tensile Tester was used for measuring at an inter-chuck distance of 64 mm and at a stress rate of 10 mm/min.

Observation of Morphology

The aforesaid specimen was prepared by injection molding. The specimen was cut at the central portion in the direction perpendicular to the flow direction, and the central portion of the section was stained. It was then cut to obtain a 0.1 μm or thinner specimen, and the dispersed particle size of the polyamide resin was measured at a magnification of 20,000 times with a transmission electron microscope.

Reference Example 1

Polymerization of PPS (PPS-1)

A 70-liter autoclave with a stirrer was charged with 8267.37 g (70.00 moles) of 47.5% sodium hydrosulfide, 2957.21 g (70.97 moles) of 96% sodium hydroxide, 11434.50 g (115.50 moles) of N-methyl-2-pyrrolidone (NMP), 2583.00 g (31.50 moles) of sodium acetate, and 10500 g of ion exchange water, and while nitrogen was fed at atmospheric pressure, the mixture was heated gradually up to 245° C., taking about 3 hours, to distill away 14780.1 g of water and 280 g of NMP. Then, the reaction vessel was cooled to 160° C. The amount of water remaining in the system for each mole of the supplied alkali metal sulfide was 1.06 moles including the water consumed for hydrolysis of NMP. Further, the amount of the hydrogen sulfide scattered was 0.02 mole for each mole of the supplied alkali metal sulfide.

Subsequently 10235.46 g (69.63 moles) of p-dichlorobenzene and 9009.00 g (91.00 moles) of NMP were added, and the reaction vessel was hermetically sealed under nitrogen gas. With stirring at 240 rpm, the mixture was heated to 238° C. at a rate of 0.6° C./min, and a reaction was performed at 238° C. for 95 minutes. Then, the reaction mixture was heated to 270° C. at a rate of 0.8° C./min, and a reaction was performed at 270° C. for 100 minutes. Then, 1260 g (70 moles) of water was pressed in, taking 15 minutes, while the reaction mixture was cooled to 250° C. at a rate of 1.3° C./min. Thereafter, it was cooled to 200° C. at a rate of 1.0° C./min, and quickly cooled to about room temperature.

The reaction mixture was taken out and diluted with 26300 g of NMP, being sieved (80 mesh) for separation into the solvent and a solid. The obtained particles were washed with 31900 g of NMP and collected by filtration. They were washed with 56000 g of ion exchange water several times and collected by filtration. They were washed with 70000 g of 0.05 wt % acetic acid aqueous solution and collected by filtration. They were washed with 70000 g of ion exchange water and collected by filtration. The obtained hydrous PPS particles were dried in hot air of 80° C. and dried at 120° C. under reduced pressure. The obtained PPS had a melt viscosity of 200 Pa·s (310° C., shear rate 1000/s).

Reference Example 2

Polyamide-1 (PA-1), Nylon 6 (Relative Viscosity 2.33)

Reference Example 3

Polyamide-2 (PA-2), Nylon 6/66 Copolymer

An aqueous solution containing 50% of the salt obtained from adipic acid and hexamethylenediamine (AH salt) and ε-caprolactam (CL) were mixed to achieve an AH salt content of 20 parts by weight and a CL content of 80 parts by weight, and the mixture was supplied into a 30-liter autoclave. The autoclave was heated to 270° C. at an internal pressure of 10 kg/cm², and subsequently with the internal temperature kept at 245° C., the pressure was gradually reduced to 0.5 kg/cm² with stirring. Stirring was stopped. Nitrogen was used to return the pressure to atmospheric pressure, and the product was pulled out as a strand, and it was pelletized. Boiling water was used to extract and remove the unreactive material, and the residue was dried. The copolyamide 6/66 resin (copolymerization ration by weight: nylon 6 component/nylon 66 component=80/20) obtained like this had a relative viscosity of 4.20 and a melting point of 193° C.

Reference Example 4

PA-3: CM2001 (Nylon 610) Produced by Toray Industries, Inc.

Reference Example 5

PA-4: Nylon 6 Oligomer (Relative Viscosity Measured in Concentrated Sulfuric Acid at a Concentration of 1% and at 25° C. was 1.20)

Examples 1 to 6 and 8

The respective ingredients shown in Table 1 were dry-blended, and the mixture was melt-kneaded using TEX30α double screw extruder produced by The Japan Steel Works, Ltd. (L/D=45.5, with three kneading portions) at a screw speed of 300 rpm, with the temperature set to ensure that the temperature of the resin delivered from the cylinder became 330° C. The melt-kneaded mixture was delivered as a strand that was then cut into pellets by a strand cutter. The pellets were dried overnight at 120° C. and injection-molded. In this way, samples of the respective Examples were obtained. The strengths and polyamide dispersed particle sizes of the samples were measured, and the results were as shown in Table 1.

Example 7

Eighty parts by weight of the PPS, 20 parts by weight of the polyamide and 1.0 part by weight of the compatibilizing agent respectively shown in Table 1 were dry-blended, and the mixture was melt-kneaded using TEX30α double screw extruder produced by The Japan Steel Works, Ltd. (L/D=45.5, with three kneading portions) at a screw speed of 300 rpm, with the temperature set to ensure that the temperature of the resin delivered from the cylinder became 330° C. The melt-kneaded mixture was delivered as a strand that was then cut into pellets by a strand cutter. The pellets were dried overnight at 120° C. and dry-blended with the PPS shown in Table 1 to ensure that the respective amounts became as shown in Table 1. The mixture was melt-kneaded and pelletized again by the same method as described above. The obtained pellets were injection-molded. The strength and polyamide dispersed particle size of the sample were measured, and the results were as shown in Table 1.

Comparative Example 1

Pelletization and evaluation were performed as described for Example 1, except that no polyamide was mixed. The results were as shown in Table 1. The material was poor in toughness.

Comparative Example 2

Pelletization and evaluation were performed as described for Example 1, except that a 40 mm diameter single screw extruder produced by Tanabe Plastics Kikai K.K. was used for melt-kneading at a set temperature of 300° C. and at a screw speed of 80 rpm. The results were as shown in Table 1. The polyamide dispersed particle size was large, and the material was poor in toughness.

Comparative Example 3

Nylon 6 oligomer was used as the polyamide and dry-blended with the respective ingredients shown in Table 1 at a ratio shown in Table 1, and the mixture was melt-kneaded using TEX30α double screw extruder produced by The Japan Steel Works, Ltd. (L/D=45.5, with three kneading portions) at a screw speed of 300 rpm, with the temperature set to ensure that the temperature of the resin delivered from the cylinder became 330° C. The melt-kneaded mixture was delivered as a strand that was then cut into pellets by a strand cutter. The pellets were dried overnight at 120° C. and injection-molded. The strength and polyamide dispersed particle size of the sample were measured, and the results were as shown in Table 1.

When nylon 6 oligomer was used without using the compatibilizing agent, the polyamide dispersed particle size became large, and the mechanical properties were poor.

TABLE 1

|  |  | Comparative Example 1 | Example 1 | Example 2 | Example 3 | Example 4 | Example 5 | Example 6 | Example 7 | Example 8 | Comparative Example 2 | Comparative Example 3 |
|---|---|---|---|---|---|---|---|---|---|---|---|---|
| PPS used |  | PPS-1 | PPS-1 | PPS-1 | PPS-1 | PPS-1 | PPS-1 | PPS-1 | PPS-1 | PPS-1 | PPS-1 | PPS-1 |
| Amount of PPS | Parts by weight | 100 | 90 | 90 | 95 | 85 | 90 | 90 | 90 | 90 | 90 | 90 |
| Polyamide used |  | — | PA-1 | PA-2 | PA-1 | PA-1 | PA-1 | PA-2 | PA-2 | PA-3 | PA-1 | PA-4 |
| Amount of polyamide | Parts by weight | — | 10 | 10 | 5 | 15 | 10 | 10 | 10 | 10 | 10 | 10 |
| Compatibilizing agent Used |  | C-1 | C-1 | C-1 | C-1 | C-1 | C-2 | C-3 | C-3 | C-3 | C-1 | — |
| Amount of compatibilizing agent | Parts by weight | 2 | 2 | 2 | 2 | 2 | 1 | 0.5 | 0.5 | 0.5 | 2 | — |
| Tensile stress at yield | MPa | 83 | 83 | 81 | 82 | 84 | 81 | 81 | 81 | 80 | 83 | 59 |
| Tensile elongation at Break | % | 25 | 105 | 215 | 90 | 85 | 122 | 215 | 225 | 230 | 45 | 90 |
| Tensile modulus of Elasticity | GPa | 2.2 | 2.3 | 2.2 | 2.2 | 2.3 | 2.3 | 2.2 | 2.2 | 2.1 | 2.2 | 1.9 |
| Polyamide dispersed particle size | Nm | — | 165 | 125 | 145 | 205 | 130 | 115 | 89 | 110 | 725 | 600 |
| Polyamide dispersed particle size after melt Residence | Nm | — | 320 | 290 | 290 | 295 | 330 | 120 | 95 | 120 | 950 | 1200 |

C-1: Bisphenol A epoxy resin ("Epikote" 1004 produced by Yuka Shell Epoxy)
C-2: Novolak phenol epoxy (ESCN-220HH produced by Sumitomo Chemical Co., Ltd.)
C-3: 3-isocyanatopropyltriethoxysilane (KBE9007 produced by Shin-Etsu Silicone)

INDUSTRIAL FIELD OF APPLICATION

The PPS resin composition is especially useful for injection molding and extrusion molding to produce films and fibers, since it is very excellent in toughness. Further, said feature can be used to apply the PPS resin composition to such structures as pipes and cases of general apparatuses and motor vehicles and also to molded metal insert articles of electric and electronic apparatuses.

The invention claimed is:

1. A process for producing a polyphenylene sulfide resin composition comprising:

melt-kneading about 99 to about 60 wt % of a polyphenylene sulfide resin (a) and about 1 to about 40 wt % of a polyamide resin (b) which is not nylon 46 and has a relative viscosity of 1.5 or more measured in concentrated sulfuric acid at a concentration of 1% and at 25° C., and about 0.1 to 10 parts by weight of a compatibilizing agent (c) which is a compound having one or more types of groups selected from epoxy groups, amino group and isocyanate group, per 100 parts by weight in total of the polyphenylene sulfide resin (a) and the polyamide resin (b), with a double screw extruder having two or more kneading portions per one screw at a temperature in a range from a melting peak temperature of the polyphenylene sulfide resin+10° C. to a melting peak temperature of the polyphenylene sulfide resin+70° C., such that the resin composition has a morphology that the polyphenylene sulfide resin (a) in the resin composition forms a sea phase while the polyamide resin (b) in the resin composition forms an island phase, and the number average dispersed particle size of the polyamide resin (b) is less than about 500 nm when the resin composition is melted and allowed to reside at 300° C. for 30 minutes.

2. The process according to claim 1, wherein the polyphenylene sulfide resin (a) is separated into two parts and one part is melt-kneaded with the polyamide resin (b) and the compatibilizing agent (c) to a pre-resin-composition, and another part is melt-kneaded with the pre-resin-composition.

3. The process according to claim 1, wherein the compatibilizing agent (c) is an alkoxy-silane containing isocyanate group.

4. The process according to claim 2, wherein the compatibilizing agent (c) is an alkoxy-silane containing isocyanate group.

* * * * *